(Model.) 2 Sheets—Sheet 1.

J. E. CRISP & G. W. COPELAND.
Boot Treeing Machine.

No. 230,752. Patented Aug. 3, 1880.

WITNESSES
Frank G. Parker
A. J. Oettinger

INVENTORS
Joseph E. Crisp
Geo. W. Copeland
by their attys
Clarke & Raymond

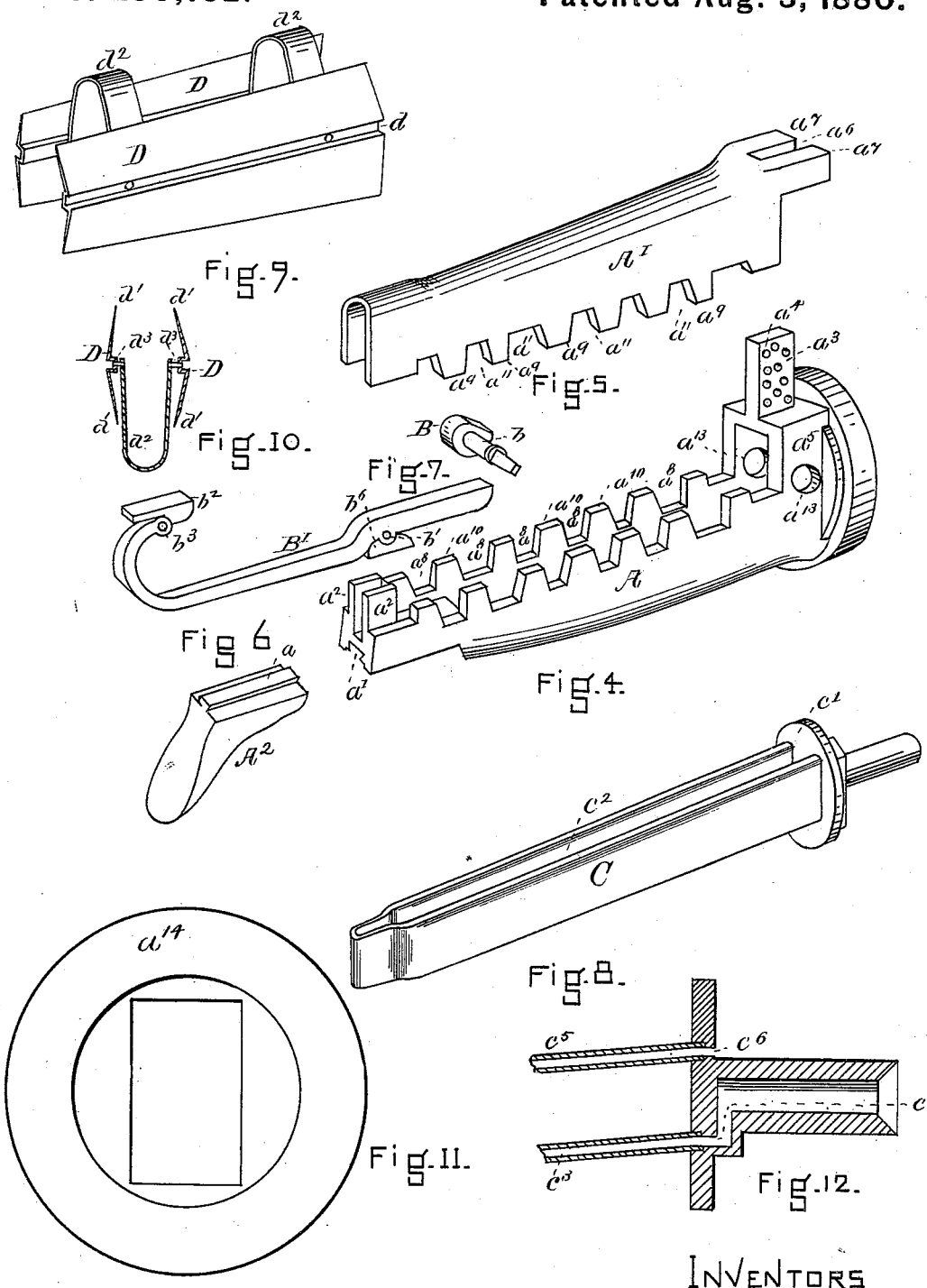

UNITED STATES PATENT OFFICE.

JOSEPH E. CRISP, OF BOSTON, AND GEORGE W. COPELAND, OF MALDEN, MASSACHUSETTS, ASSIGNORS TO THE COPELAND BOOT TREEING MACHINE COMPANY.

BOOT-TREEING MACHINE.

SPECIFICATION forming part of Letters Patent No. 230,752, dated August 3, 1880.

Application filed May 31, 1880. (Model.)

*To all whom it may concern:*

Be it known that we, GEORGE W. COPELAND, of Malden, in the county of Middlesex, and JOSEPH E. CRISP, of Boston, in the county of Suffolk, and Commonwealth of Massachusetts, have invented an Improvement in Boot-Treeing Machines, of which the following is a specification.

This invention relates to an improvement upon the boot-treeing machines described in Letters Patent Reissue No. 9,055, granted J. E. Crisp, assignor, and dated January 20, 1880, and in Letters Patent Reissue No. 9,124, granted said Crisp, assignor, and dated March 23, 1880; and it embraces, first, means for supporting a boot-tree in the machine whereby the leg part of the boot-tree or a portion thereof is eccentric to the axis of revolution of the tree and the foot part of the tree is inclined to its axis; second, a boot-tree of novel construction; third, peculiar means for enlarging the tree by spreading its parts; fourth, means for providing a continuous surface to the tree by plates of thin sheet metal arranged to cover the lines of separation of the two parts of the tree on either side, the said plates being adapted to receive the side seams, and being fastened to each other and to the tree in a manner to prevent displacement during the truing process; fifth, a method of heating a tree by the radiation of heat from a radiator within the tree; sixth, devices for practically applying said method of heating to the tree; seventh, various details in construction.

Reference is made to the accompanying drawings, forming a part of this specification, in explaining the nature of our invention, in which—

Figure 1:
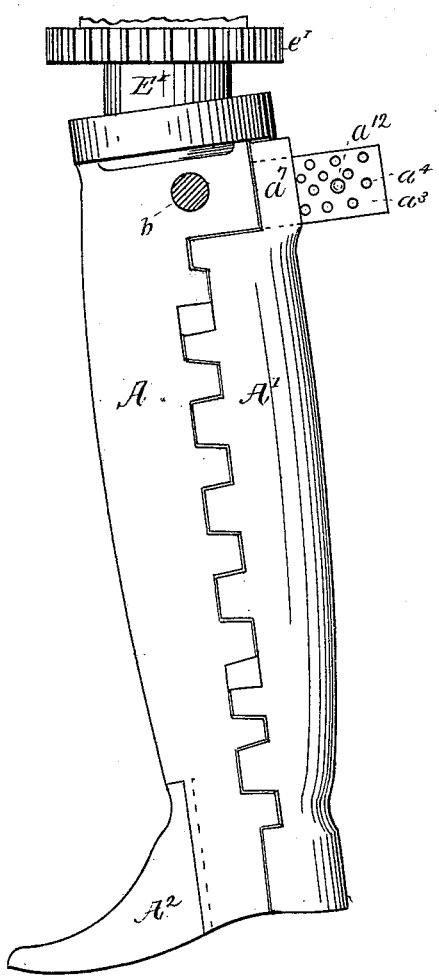
Figure 2:
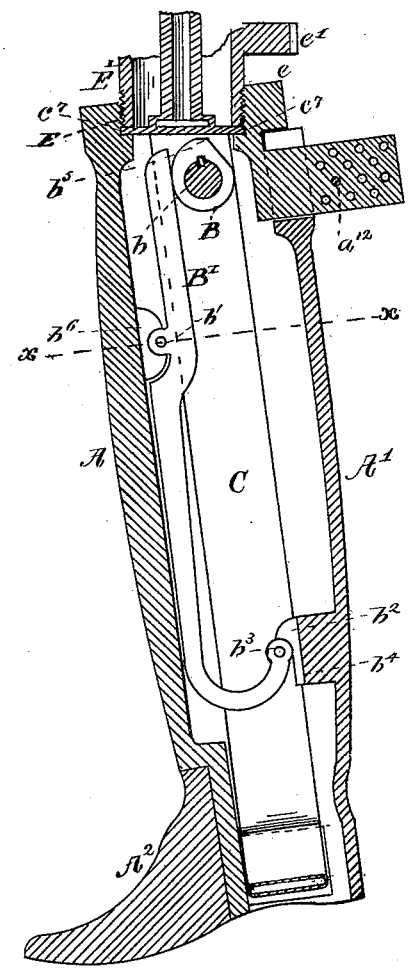
Figure 3:
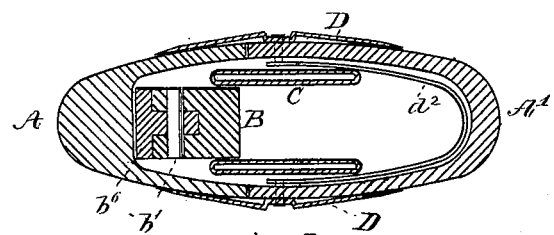

Figure 1 is an elevation of the boot-tree. Fig. 2 is a vertical central section thereof. Fig. 3 is a cross-section on the line $x\ x$ of Fig. 2. Fig. 4 is a perspective of the back part of the boot-tree. Fig. 5 is a perspective of the front part of the boot-tree. Fig. 6 is a perspective of a portion of the mechanism employed in separating the two parts of the tree. Fig. 7 is a perspective of a cam for operating the spreading mechanism and its shaft. Fig. 8 is a perspective of the radiator. Fig. 9 is a perspective of the side plates and their connections. Fig. 10 is a cross-section thereof, showing the construction. Fig. 11 is a view of the end of the tree in elevation. Fig. 12 is a section illustrating the construction of the radiator at the knee end.

The boot-tree consists in the back and fore parts, A A', and the foot portion $A^2$. The foot portion is provided with a dovetail projection, $a$, which slides into a dovetail recess, $a'$, in the fore part of the tree, and is locked thereto by a set-screw, or in any other desirable way.

The fore part, A, of the tree is represented in Fig. 4, and it is made of thin metal, preferably of cast-iron, and it is provided with the projections $a^2$ at its lower end, which are adapted to enter a recess in the lower end of the back part, A', and with the block $a^3$, which may or may not be provided with perforations $a^4$, and which is fastened to or cast with the block $a^5$ at the heel end of the part.

The block $a^3$ is arranged to enter recess $a^6$ between the projections $a^7$ of the back part, A', of the tree, and the said block $a^3$ and the projections $a^2$, in connection with the said recess $a^6$ in the back part, A', and the recess in the lower part above mentioned, serve to center the two parts when together. The part A is further provided with the series of recesses $a^8$, which are adapted to receive the projections or tongues $a^9$ on the part A', and the tongues $a^{10}$ of the part A close into the recesses $a^{11}$ of the part A'.

The recesses $a^8\ a^{11}$ in the above parts are somewhat wider than the projections or tongues, which are arranged to center the same, in order that there may be a slight lateral play in bringing the two parts together. The recesses, preferably, are wider at their mouth, and the projections are narrower at their end, for the same reason.

The block $a^3$, when perforated, may be used in connection with a pin, $a^{12}$, to limit the extent of movement of the two parts of the tree, the pin acting as a stop.

The part A is further provided with the holes $a^{13}$, which furnish bearings for the shaft $b$, carrying the cam B. The part A is also provided with the circular ring $a^{14}$.

The mechanism for spreading the part consists in the cam B, the shaft $b$, above referred to, and the spring-lever B', which is curved, as shown, is pivoted at $b'$ to the lug $b^6$ on the inner surface of the fore part, A, and is furnished at its extreme end with the foot $b^2$, pivoted thereto at $b^3$, the foot being arranged to contact with the abutment $b^4$, projecting inwardly from the inner face of the back part, A'.

In spreading the tree the cam B is turned by means of the shaft $b$ and a suitable handle or crank until the flat portion $b^5$ is brought in contact with the side of the lever, and the spring-lever causes the two parts to be separated as much as the boot-leg will permit; and as the leather is softened during the treeing operation, it is desirable not only that this power for separating the two parts be constant, but also that there be provision for a farther separation of the parts as the leather softens under the treeing manipulation, in order that all the slack may be taken up and the boot-leg be under a constant strain. If the lever B' were rigid this continued action could not be accomplished by it; but by making the lever act additionally as a spring the two parts are not only separated as far as the boot-leg will permit at the commencement of the treeing operation, but the lever acts additionally and automatically as a spring after its office as a lever has ceased, and therefore maintains a constant pressure upon the two parts, whereby the boot-leg is kept under a constant tension while the leather is being softened, fitted, and finished.

The flat portion $b^5$ of the cam operates as a stop in holding the cam and lever in position; but any other device for locking them can be employed.

The tree is heated by means of a radiator, C. It may consist of the flattened pipe, which is extended down from the disk $c'$ on one side of the tree to the bottom, and up on the other side to the disk, or of a coiled pipe, or of a shell inclosing a heated bar, or of any other suitable device for applying heat to the interior of the tree. The radiator is separated from the inner sides of the tree, in whole or in part, by a space sufficient to permit the air in the tree to be more or less uniformly heated by radiation. The space $c^2$, between the vertical parts of the radiator shown, affords room for the operation of the spring-lever B'.

Any heat-giving medium may be introduced into the pipe or shell or case—either hot air, hot water, or steam; or a radiator may be heated before it is inserted into the tree, or it may contain a bar of heated metal, which may be removed from time to time, and reheated as occasion requires. We prefer, however, to use steam, hot air, or hot water; and the radiator represented is constructed for such use, the heating medium passing into the portion $c^3$ by means of the inlet $c^4$, and out from the portion $c^5$ by the exhaust passage or outlet $c^6$.

Of course, in lieu of the separate passages, one passage, which shall be both the inlet and the outlet, can be used, in which case the hot water, hot air, or the steam would be introduced, and when cooled sufficiently to be of no service would be withdrawn and a fresh supply provided.

This method of heating by radiation is an improvement over the method heretofore employed, in which the heating medium is brought directly in contact with the shell of the tree, in that any desired heat lower than that of the heating medium can be easily obtained; in that the air around the radiator is substantially, uniformly, and evenly heated; and in that there is provided a better opportunity for effecting this uniform heating of the shell of the tree, which is a very desirable feature, on account of the ease and facility with which certain parts of the radiator may be clothed by non or poor conductors of heat, or otherwise arranged to cause the shell of the boot-tree to be heated uniformly throughout.

As the two parts A A' of the boot-tree separate in the act of stretching a boot-leg, the continuity of the surface of the tree along the lines of division is broken, and a portion of the boot-leg along those lines is unsupported by any portion of the parts A A'. It is therefore necessary that the lines of separation be covered by plates that shall give a continuous bearing for the boot-leg at such places. For this purpose we have provided the side pieces, D. These pieces are made of thin sheet metal, and are provided with the channels $d$ for the reception of the side seams of the boot. Each plate, preferably, is struck up from one piece of sheet metal. The edges $d'$ should be made as thin as possible, in order that the change from the surface of the boot-tree proper to the side piece should be without appreciable interruption. The two side pieces are connected by bands $d^2$, which extend from piece to piece, as represented in Fig. 10, the said bands being adapted to fit the inside of the back part of the tree. The ends of the bands and the parts D are connected by the bolts or rivets $d^3$, which pass from the ends of the bands, in the inside of the tree, between the two parts of the boot-tree, to the portion of the parts D forming the bottom of the channels $d$.

This construction insures the permanency of the position of said plates in relation to the back part, A', of the tree, as well as the permanent relation, position, and parallelism of one channel $d$ to the other.

This construction is very essential, as it is necessary that the channels $d$ be parallel and be not moved during the treeing process, in order that the boot-leg may be properly held upon the boot-tree during the treeing process, and the side seams not worked from a vertical position and one directly opposite. If some such provision is not employed, as the boot-leg is being worked the side seams are very likely to be twisted or moved out of a parallel position, and when the boot is removed from the tree the seams will not return to their original place, and the boot-leg will consequently be more or less distorted.

In order that the boot-tree or parts thereof may be eccentric to its axis of revolution, I provide the disk $a^{14}$ with a screw-thread, E, which is inclined to the true axis of the tree.

The hollow post or shaft E' is provided with a screw-thread, $e$, on a line with its axis, and also with a gear-wheel, $e'$, which is the equivalent of the gear-wheel $a^3$ described, in said Patent No. 9,055.

The disk $c'$ of the radiator is adapted to rest upon the shoulders $c^7$ of the boot-tree, and, when the boot-tree is screwed upon the hollow post, is held firmly in position thereby, as represented in Fig. 2, the steam-inlet $c^4$ being surrounded by the hollow post, and the exhaust $c^6$ entering it.

The axis of revolution of the tree will be a continuation of the axis of the post, and if the boot-tree is inclined in relation to the axis of the post a portion thereof will be more or less eccentric to the axis of its revolution, and the extent of the eccentricity may be varied by increasing or diminishing the inclination of the tree in relation to the axis of the post.

This method of supporting the tree is advantageous, in that it presents the foot portion of the tree to the working tools or the finishing mechanism in a more inclined position than would otherwise be the case, and the tools for operating upon the foot portion of the tree, described in the last-named patent, are so arranged that they are adapted to work better upon an inclined surface than upon a surface that is parallel with their supporting-arms.

We do not confine ourselves to this method of supporting the boot-tree, whereby certain portions are provided with the eccentric revolution.

The operation of our machine is as follows: The radiator is heated either by the passage of hot air, hot water, or steam through the same, or by being placed in a suitable furnace; and in the latter instance is then inserted into the hollow tree, and the shell of the tree is heated to the proper temperature. The foot part of the tree is heated by mersion in hot water, or in any other suitable way, and the boot is then adjusted upon the tree. The cam is then rotated, causing the lever to separate the two parts of the tree, thus exerting a strain upon the boot-leg. The boot-leg is then in a condition to be operated upon either by hand or by automatic rubbing and finishing tools, such as are described in said patent to Crisp, or any other suitable rubbing and finishing appliances. The filling composition and dressings are put on at any stage in the process, at the discretion of the workman. As the treeing or molding and finishing of the boot progresses the leather becomes more pliable and softer, and the spring-lever B' continues to act in pressing the two portions of the tree apart.

It will be observed that the sole of the boot closes the lower end of the tree, so that the radiator may be extended farther downward than if it were provided with a solid bottom, thereby effecting the perfect heating of the lower part of the tree. Of course we may use the radiator with a hollow tree of any other construction, and also the spring-lever and its operating mechanism in an unheated tree; also, any tree may be hung in relation to the actuating mechanism for revolving the same without departing from the spirit of this invention.

It will be seen that the boot-tree is hollow throughout, and is therefore light, and is adapted to receive the radiator; also, that the two parts can be very cheaply made.

It is not essential that both centering mechanism and interlocking tongues and recesses be employed, as one can be used without the other, and we do not confine ourselves to the particular form of centering mechanism shown.

We are aware that the Patent No. 227,669, granted Ambler and Wires, shows and describes a hollow boot-tree adapted to be heated by a current of hot air or gases introduced into the chamber of the tree through a supply-pipe, whereby the chamber is filled with heated air or gases which have previously been heated outside the tree by any desirable means, and which are passed through it; but the said patent does not show nor describe means whereby the shell of the tree is heated by air contained within the tree and heated within the tree by a radiator, and therefore we do not consider that the said patent embraces the spirit of our invention.

Having thus fully described our invention, we claim and desire to secure by Letters Patent of the United States—

1. In a boot-tree, the combination of the two parts A A', and means for centering the parts, consisting in the projections $a^2$, block $a^3$, and recess $a^6$, substantially as and for the purposes described.

2. In a boot-tree, the combination of the hollow back part, A', and the hollow fore part, A, and means for centering the same, and the series of interlocking tongues and recesses, substantially as and for the purposes described.

3. The combination of the parts A A' of the boot-tree, and the spring-lever B', pivoted to the part A, and bearing against the abutment $b^4$, near the lower end of the part A', and means for operating said lever, substantially as and for the purposes described.

4. The combination, in a boot-tree, of the parts A A', the spring-lever B', and a cam, B, substantially as and for the purposes described.

5. In a boot-tree, a spring-lever for opening the parts A A', adapted to be operated by a cam in partially separating the two parts, and afterward to act automatically in causing a farther separation of said parts, substantially as and for the purposes described.

6. In a boot-tree, a spring-lever B', adapted to be positively operated in separating the two parts of the tree by the cam B, which also converts the lever into a spring which acts automatically to open the boot-tree farther, substantially as and for the purpose described.

7. In a boot-treeing-machine, a boot-tree eccentric to the axis of the supporting-journal, and adapted to be revolved upon an axis more or less inclined to the axis of the journal, substantially as and for the purposes described.

8. The combination of a boot-tree provided with a screw-thread, E, inclined in relation to the true axis of the tree, as described, with the hollow post or journal E', provided with the screw-thread e, parallel with its axis, substantially as and for the purposes described.

9. In a boot-tree, the combination of the part A, provided with the perforated block $a^3$, the part A', provided with the recess $a^6$, and a pin for limiting the extent of movement of a part, A', in relation to the part A, substantially as and for the purposes described.

10. A side piece, D, made of one piece of sheet metal, and provided with the channel $d$.

11. The combination of the side pieces, D, and means, substantially as described, for connecting them together and for fastening them to the boot-tree.

12. The combination of a hollow boot-tree with a heat-radiator contained within said tree, but not opening therein, surrounded and separated from the shell thereof by an air-space, whereby the entire shell of the tree is uniformly heated by air heated within the tree by the radiator, substantially as and for the purposes described.

13. The combination of a hollow boot-tree with a heat-radiator arranged within said tree, surrounded and separated from the shell thereof by an air-space, whereby the entire shell of the tree is uniformly heated, substantially as and for the purposes described.

14. The radiator C, adapted to be inserted into a hollow boot-tree, and provided with an inlet and outlet for the passage of steam, hot air, or hot water, substantially as and for the purposes described.

15. A hollow boot-tree consisting of the two parts A A', shaped as shown, and a foot-piece, all substantially as described.

J. E. CRISP.
GEO. W. COPELAND.

Witnesses:
F. F. RAYMOND, 2d,
A. J. OETTINGER.